US012042871B2

(12) United States Patent
Katagiri (10) Patent No.: US 12,042,871 B2
(45) Date of Patent: Jul. 23, 2024

(54) DRILL

(71) Applicant: TUNGALOY CORPORATION, Fukushima (JP)

(72) Inventor: Takao Katagiri, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 309 days.

(21) Appl. No.: 17/558,407

(22) Filed: Dec. 21, 2021

(65) Prior Publication Data

US 2022/0241872 A1 Aug. 4, 2022

(30) Foreign Application Priority Data

Jan. 27, 2021 (JP) .................................. 2021-010923

(51) Int. Cl.
 *B23B 51/02* (2006.01)
(52) U.S. Cl.
 CPC .......... *B23B 51/02* (2013.01); *B23B 2251/12* (2013.01); *B23B 2251/125* (2013.01); *B23B 2251/44* (2013.01)
(58) Field of Classification Search
 CPC .......... B23B 2251/12; B23B 2251/122; B23B 2251/125; B23B 2251/182; B23B 2251/448; B23B 2251/44; B23B 2250/18
 See application file for complete search history.

(56) References Cited

U.S. PATENT DOCUMENTS

| 10,850,333 | B2 | 12/2020 | Katagiri | |
|---|---|---|---|---|
| 2019/0375029 | A1 | 12/2019 | Katagiri | |
| 2020/0282464 | A1* | 9/2020 | Johnson | .................. C23C 14/08 |
| 2020/0324348 | A1* | 10/2020 | Yoshioka | ................ B23B 51/02 |

FOREIGN PATENT DOCUMENTS

| JP | S55-031536 A | 3/1980 |
|---|---|---|
| JP | 2004-268230 A | 9/2004 |
| JP | 4608933 B2 | 1/2011 |
| JP | 2019-209439 A | 12/2019 |

* cited by examiner

*Primary Examiner* — Alan Snyder
(74) *Attorney, Agent, or Firm* — Studebaker & Brackett PC (57) ABSTRACT

A drill in which: a chip discharge groove is formed in an outer periphery of an edge portion serving as a leading end side portion of a drill body; and a cutting edge is formed in an intersecting edge between a rake surface of a leading end side region and a leading end flank of the edge portion, the drill comprising a margin portion, a shoulder portion and a web thinning portion, wherein: the cutting edge comprises, in order from a rotation center, a first cutting edge portion, a second cutting edge portion, a shoulder cutting edge portion, and a margin cutting edge portion; the honing width gradually decreases from the boundary P1 toward the position P2; and the conditions represented by expression (1): honing width of second cutting edge portion≤R1 and expression (2): 2.0<R1/R2<5.0 are satisfied.

13 Claims, 7 Drawing Sheets

DRILL

BACKGROUND OF THE INVENTION

Field of the Invention

The present invention relates to a drill.

Description of Related Art

A conventional drill for drilling is known in which cutting edges are subjected to honing and therefore become resistant to fracturing.

For example, JP2004-268230 A proposes a drill in which: a chip discharge groove which extends toward a base end is formed in an outer periphery of an edge portion serving as a leading end side portion of a drill body rotated around an axis; a cutting edge is formed in an intersecting edge between an inner wall surface of the chip discharge groove and a leading-end flank of the edge portion, wherein such inner wall surface faces forward with respect to a drill rotating direction; and, on a leading end side of the inner wall surface of the chip discharge groove, a web thinning portion is formed which leads to an inner peripheral end of the cutting edge, whereby the inner peripheral end of the cutting edge serves as a web thinning cutting edge portion, and in the above drill, honing is performed on the cutting edge; the honing width of the web thinning cutting edge portion is set so as to be constant throughout the web thinning cutting edge portion; and the honing width of an outer peripheral end of an outer peripheral cutting edge portion leading to an outer periphery of the web thinning cutting edge portion is set so as to be at least 1.5 times greater than the honing width of the web thinning cutting edge portion.

Further, for example, JP4608933 B proposes a drill in which: a chip discharge groove which extends toward a base end is formed in an outer periphery of a drill body rotated around an axis; and a cutting edge is formed in an intersecting edge between a rake surface serving as a leading end side region of an inner wall surface of the chip discharge groove and a leading end surface of the drill body, wherein such inner wall surface faces forward with respect to a drill rotating direction, and in the above drill, honing is performed on a shoulder portion which extends, from the outer peripheral end of the cutting edge, backward with respect to the drill rotating direction, such shoulder portion being an intersecting edge between an outer peripheral margin portion and the leading end surface of the drill body, wherein such outer peripheral margin portion intersects with the rake surface and faces toward an outer periphery; and the honing width in the honing performed on the shoulder portion is set so as to be equal to or smaller than the honing width in the honing performed on the cutting edge.

SUMMARY

Technical Problem

With regard to drills for drilling, while there has been a trend toward cutting conditions becoming more severe compared with the prior art, in order to increase machining efficiency, a longer tool life than that achieved so far is being demanded. In particular, in a drill for drilling a thin plate, fracturing is prone to occur in a shoulder portion thereof. This makes it difficult to extend the life of the drill.

Due to such reason, in the drill disclosed in JP2004-268230 A, even if the honing width of the outer peripheral end of the outer peripheral cutting edge is merely set so as to be greater than the honing width of the web thinning cutting edge, breakage of the drill is likely to occur due to increased cutting resistance. In addition, due to the increased cutting resistance, a machined surface quality (machining accuracy) deteriorates. As a result, in the drill disclosed in JP2004-268230 A, the tool life is shortened and there is room for improvement.

In the drill disclosed in JP4608933 B, the honing width of the shoulder portion is smaller than the width of the cutting edge, and this leads to insufficient strength of the shoulder portion. As a result, it is difficult to extend the tool life of the drill disclosed in JP4608933 B.

The present invention has been made in light of the above circumstances, and an object of the present invention is to provide a drill which has excellent wear resistance and fracture resistance and which accordingly allows for an extended tool life.

Solution to Problem

The present inventor has conducted studies regarding extending the tool life of a drill and has accordingly found that the wear resistance and fracture resistance thereof can be improved by setting the honing width of the cutting edge portion of the drill so as to satisfy a specific condition, and found that, as a result, the tool life of the drill can be extended, and this has led to the completion of the present invention.

Namely, the gist of the present invention is as set forth below.

[1] A drill in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the drill comprising:

a margin portion intersecting with the rake surface and facing toward the outer periphery;

a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion, honing is performed on the second cutting edge portion, the margin cutting edge portion and the shoulder cutting edge portion, when a honing width at a boundary P1 between the margin cutting edge portion and the shoulder cutting edge portion is defined as R1, and a honing width at a position P2 separated 3 mm from the boundary P1 in a direction opposite to the second cutting edge portion is defined as R2 in the margin cutting edge portion,
the honing width gradually decreases from the boundary P1 toward the position P2, and
conditions represented by expression (1) and expression (2) below are satisfied:

$$\text{honing width of second cutting edge portion} \leq R1 \quad (1)$$

$$2.0 < R1/R2 < 5.0 \quad (2).$$

[2] The drill according to [1], wherein the R1 is 50 μm or more and 200 μm or less, and the R2 is 15 μm or more and less than 50 μm.

[3] The drill according to [1] or [2], wherein the honing width of the second cutting edge portion is 30 μm or more and 100 μm or less.

[4] The drill according to any one of [1] to [3], wherein, when an arithmetic mean roughness of a honed portion in a first range from the boundary P1 to the position P2 is defined as Ra1, and an arithmetic mean roughness of a honed portion in a second range other than the first range in the margin cutting edge portion is defined as Ra2, a condition represented by expression (3) below is satisfied:

$$Ra1 < Ra2 \quad (3).$$

[5] The drill according to [4], wherein the Ra1 is 0.1 μm or more and 1.0 μm or less, and the Ra2 is 0.2 μm or more and 2.0 μm or less.

[6] A coated drill having a coated layer formed on a surface thereof, in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the coated drill comprising:

a margin portion intersecting with the rake surface and facing toward the outer periphery;

a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion, honing is performed on the second cutting edge portion, the margin cutting edge portion and the shoulder cutting edge portion, when a honing width at a boundary P1 between the margin cutting edge portion and the shoulder cutting edge portion is defined as R1, and a honing width at a position P2 separated 3 mm from the boundary P1 in a direction opposite to the second cutting edge portion is defined as R2 in the margin cutting edge portion, the honing width gradually decreases from the boundary P1 toward the position P2, and
conditions represented by expression (1) and expression (2) below are satisfied:

$$\text{honing width of second cutting edge portion} \leq R1 \quad (1)$$

$$2.0 < R1/R2 < 5.0 \quad (2).$$

[7] The coated drill according to [6], wherein the coating layer comprises a compound layer containing a compound of: an element of at least one kind selected from the group consisting of Ti, Zr, Hf, V, Nb, Ta, Cr, Mo, W, Al and Si; and an element of at least one kind selected from the group consisting of C, N, O and B.

[8] The coated drill according to [6] or [7], wherein the coating layer comprises a compound layer containing a compound having a composition represented by expression (4) below:

$$(Ti_{1-x}Si_x)N \quad (4)$$

(in the expression, x indicates an atomic ratio of the element Si to a total of the element Ti and the element Si and satisfies $0.05 \leq x \leq 0.40$).

[9] The coated drill according to any one of [6] to [8], wherein an average thickness of the entire coating layer is 0.5 μm or more and 8.0 μm or less.

[10] The coated drill according to any one of [6] to [9], wherein the R1 is 50 μm or more and 200 μm or less, and the R2 is 15 μm or more and less than 50 μm.

[11] The coated drill according to any one of [6] to [10], wherein the honing width of the second cutting edge portion is 30 μm or more and 100 μm or less.

[12] The coated drill according to any one of [6] to [11], wherein, when an arithmetic mean roughness of a honed portion in a first range from the boundary P1 to the position P2 is defined as Ra1, and an arithmetic mean roughness of a honed portion in a second range other than the first range in the margin cutting edge portion is defined as Ra2, a condition represented by expression (3) below is satisfied:

$$Ra1 < Ra2 \quad (3).$$

[13] The coated drill according to [12], wherein the Ra1 is 0.1 μm or more and 1.0 μm or less, and the Ra2 is 0.2 μm or more and 2.0 μm or less.

Advantageous Effects of Invention

The present invention can provide a drill which has excellent wear resistance and fracture resistance and which accordingly allows for an extended tool life.

DETAILED DESCRIPTION

An embodiment for carrying out the present invention (hereinafter simply referred to as the "present embodiment") will hereinafter be described in detail, with reference to the attached drawings as appropriate. However, the present invention is not limited to the present embodiment below. Various modifications may be made to the present invention without departing from the gist of the invention.

Drill

A drill according to the present embodiment is a drill in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the drill comprising: a margin portion intersecting with the rake surface and facing toward the outer periphery; a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein: the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion; honing is performed on the second cutting edge portion, the margin cutting edge portion and the shoulder cutting edge portion; when a honing width at a boundary P1 between the margin cutting edge portion and the shoulder cutting edge portion is defined as R1, and a honing width at a position P2 separated 3 mm from the boundary P1 in a direction opposite to the second cutting edge portion is defined as R2 in the margin cutting edge portion, the honing width gradually decreases from the boundary P1 toward the position P2, and the conditions represented by the following expression (1) and the following expression (2) are satisfied.

$$\text{honing width of second cutting edge portion} \leq R1 \quad (1)$$

$$2.0 < R1/R2 < 5.0 \quad (2).$$

Figure 3:
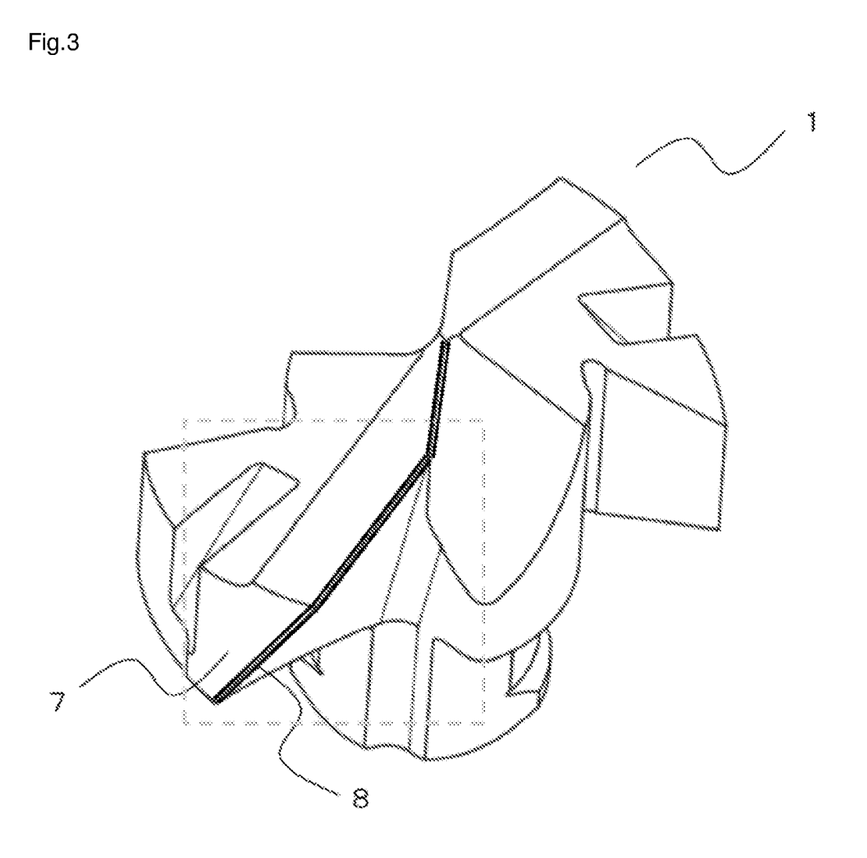
FIG. 3 shows an example of a perspective view of an insert body used in a drill according to the present invention.
Figure 4:
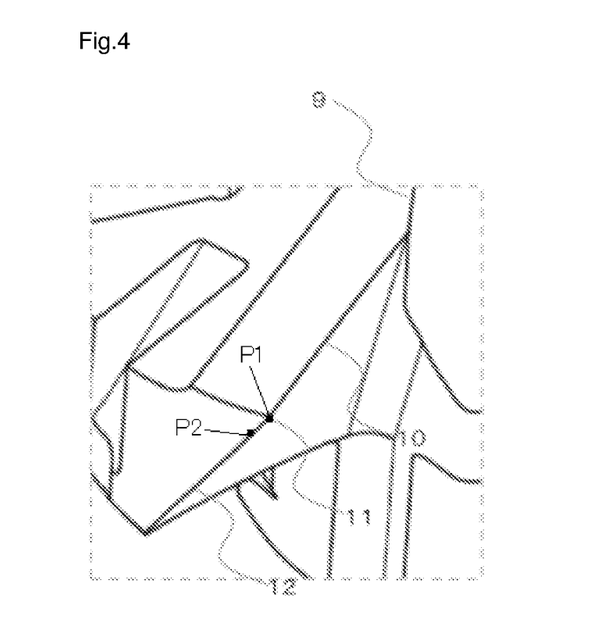
FIG. 4 is an enlarged view of the portion surrounded by the dotted line in the perspective view shown in FIG. 3.
Figure 6:
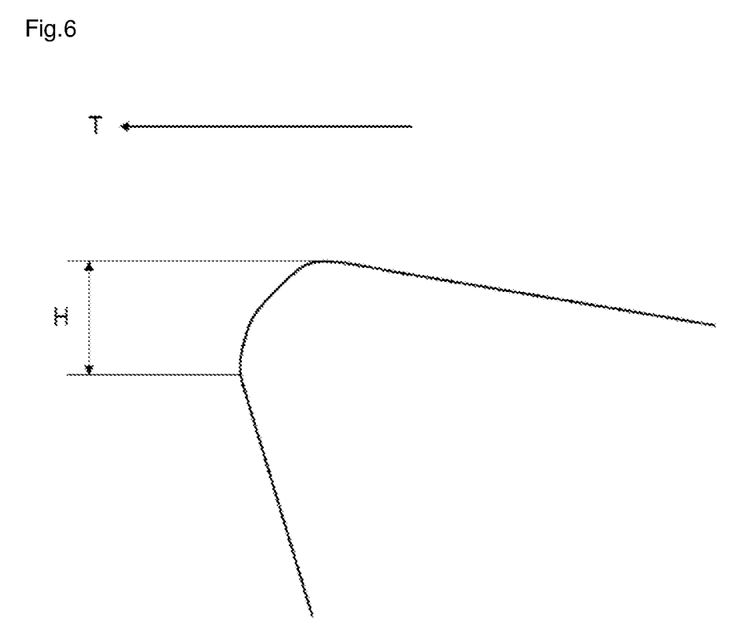
FIG. 6 shows an example of a schematic view when a cross-section of a cutting edge of a drill according to the present invention is enlarged.

In the present embodiment, the second cutting edge portion, the shoulder cutting edge portion and the margin cutting edge portion, each of which is subjected to honing, respectively refer to the respective portions indicated by reference numerals 10, 11 and 12 in shown in FIG. 4 (an enlarged view of a portion surrounded by a dotted line in a perspective view shown in FIG. 3). Further, a honing width refers to, in the cross-section of the cutting edge portion shown in FIG. 6, a length H along a direction orthogonal to a drill rotating direction T.

In the drill of the present embodiment, the honing width of the margin cutting edge portion is set so as to satisfy a specific condition, as described above, and this allows for improved wear resistance and fracture resistance, as a result which the tool life thereof can be extended. The factors for the improvements in the wear resistance and fracture resistance of the drill of the present embodiment can be considered to be set forth as follows; however, the present invention is not in any way limited by the factors set forth below. That is, when the honing width at the boundary P1 between the margin cutting edge portion and the shoulder cutting edge portion is defined as R1, and the honing width at the position P2 separated 3 mm from the boundary P1 in the direction opposite to the second cutting edge portion in the margin cutting edge portion is defined as R2, the cutting edge is strengthened as the honing width gradually decreases from P1 to P2, and thus the fracture resistance of the drill is improved. In addition, as shown in the above expression (1), by setting the honing width of the second cutting edge portion to be equal to or less than the honing width R1 at the boundary P1, cutting resistance of the drill is reduced and a machined surface quality (machining accuracy) is improved. Further, since occurrence of chattering is inhibited, breakage of the drill can be inhibited. Also, as shown in the above expression (2), when the relationship R1/R2 of the honing width exceeds 2.0, the cutting edge of the drill is strengthened, and the effect of reducing the cutting resistance of the drill becomes remarkable. On the other hand, when the relationship R1/R2 of the honing width is less than 5.0, the wear resistance in the vicinity of the shoulder cutting edge portion is excellent, and the cutting edge of the margin cutting edge portion is strengthened to improve the fracture resistance of the drill.

In addition, by combining these configurations, the drill of the present embodiment has an excellent balance between the wear resistance and the fracture resistance, and as a result, the tool life can be extended. In particular, even when the drill of the present embodiment has the shoulder portion, it has high fracture resistance so that the tool life can be extended. Further, it is considered that, by reducing the cutting resistance, the drill of the present embodiment can achieve improvements in cutting performance such as inhibition of occurrence of chattering and an improvement in machined surface quality (machining accuracy). The drill of the present embodiment provides the above-mentioned effects particularly in drilling a thin plate.

Also, in the drill of the present embodiment, R1 is preferably 50 μm or more and 200 μm or less, and more preferably 55 μm or more and 195 μm or less. In the drill of the present embodiment, when R1 is equal to or more than the lower limit value, the cutting edge is strengthened, and thus the fracture resistance tends to be further improved, and when it is equal to or less than the upper limit value, the cutting resistance decreases, and thus the wear resistance tends to be further improved.

Also, in the drill of the present embodiment, R2 is preferably 15 μm or more and less than 50 μm, and more preferably 15 μm or more and 45 μm or less. In the drill of the present embodiment, when R2 is equal to or more than the lower limit value, the cutting edge is strengthened, and thus the fracture resistance tends to be further improved, and when it is less than the upper limit value, the cutting resistance decreases, and thus the wear resistance tends to be further improved.

Also, in the drill of the present embodiment, R1/R2 exceeds 2.0 and is less than 5.0, and is preferably 2.1 or more and 4.8 or less. When R1/R2 exceeds 2.0, the cutting edge of the drill is strengthened, and the effect of reducing the cutting resistance of the drill becomes remarkable. On the other hand, when the relationship R1/R2 of the honing width is less than 5.0, the wear resistance in the vicinity of the shoulder cutting edge portion is excellent, and the cutting edge of the margin cutting edge portion is strengthened to improve the fracture resistance of the drill.

Also, in the drill of the present embodiment, when a range from P1 to P2 is defined as the first range, the honing width of the second range other than the first range (a range exceeding P2) in the margin cutting edge portion is preferably smaller than R2. In the drill of the present embodiment, when the honing width in the second range (the range exceeding P2) is further smaller than R2, the cutting resistance decreases and the wear resistance tends to be further improved. The honing width of the second range (the range exceeding P2) is preferably 10 μm or more and 45 μm or less, and more preferably 10 μm or more and 40 μm or less.

Also, in the drill of the present embodiment, the honing width of the second cutting edge portion is preferably 30 μm or more and 100 μm or less, and more preferably 35 μm or more and 95 μm or less. When the honing width of the second cutting edge portion is equal to or more than the lower limit value, the cutting edge is strengthened, and thus the fracture resistance is further improved, and when it is equal to or less than the upper limit value, the cutting resistance decreases, and thus the wear resistance is further improved.

In the present embodiment, the honing at each portion can be performed using a honing machine. In addition, in the honing process, for example, a width of the honing at each portion can be controlled within a desired range by adjusting an inclination of a substrate and a method of applying a brush. Further, in the honing process, for example, the honing width can be gradually reduced from P1 to P2 by gradually shortening processing times from P1 to P2.

Also, when the arithmetic mean roughness of the honed portion in the first range from P1 to P2 is defined as Ra1, and the arithmetic mean roughness of the honed portion of the second range other than the first range (the range exceeding P2) in the margin cutting edge portion is defined as Ra2, the drill of the present embodiment preferably satisfies the relationship of the following expression (3).

$$Ra1 < Ra2 \qquad (3).$$

In the drill of the present embodiment, when the relationship of the above expression (3) is satisfied in the margin cutting edge portion, the surface roughness Ra is smoother at the honed portion in the first range from P1 to P2 than at the honed portion in the second range exceeding P2, and thus the cutting resistance when it is caused to bite into a workpiece is further reduced, and the occurrence of chattering tends to be inhibited.

In addition, in the present embodiment, the arithmetic mean roughness of the honed portion can be measured according to JIS B0601 2001.

Also, in the drill of the present embodiment, Ra1 is preferably 0.1 μm or more and 1.0 μm or less, more preferably 0.2 μm or more and 0.9 μm or less, and further preferably 0.3 μm or more and 0.8 μm or less. The drill of the present embodiment can be easily manufactured when Ra1 is equal to or more than the lower limit value, and when Ra1 is equal to or less than the upper limit value, the cutting resistance when it is caused to bite into the workpiece is further reduced, and the occurrence of chattering can be inhibited.

Also, in the drill of the present embodiment, Ra2 is preferably 0.2 μm or more and 2.0 μm or less, more preferably 0.8 μm or more and 1.5 μm or less, and further preferably 0.9 μm or more and 1.4 μm or less. In the drill of the present embodiment, when Ra2 is equal to or more than the lower limit value, it is easy to control the honing width of the margin cutting edge portion, and when Ra2 is equal to or less than the upper limit value, the cutting resistance at the time of hole drilling decreases, and the roughness of a machined surface decreases.

In the present embodiment, the arithmetic mean roughness of the honed portion can be controlled in accordance with a honing process time. For example, in the honing process, as a time for processing with a brush increases, the surface roughness of a substrate becomes smoother, and thus the arithmetic mean roughness of the honed portion decreases. In a coated drill, which will be described later, the surface roughness of a coating layer changes due to unevenness of the surface roughness of a substrate, and thus as the surface roughness of the substrate decreases, the surface roughness of the coating layer also decreases, and thus the arithmetic mean roughness of the honed portion decreases.

The drill of the present embodiment has an excellent balance between the wear resistance and the fracture resistance when the honing width at the margin cutting edge portion is set to have the specific relationship described above. Further, by reducing the cutting resistance, the drill of the present embodiment can achieve improvements in cutting performance such as inhibition of the occurrence of chattering and reduction in the roughness of the machined surface.

The substrate for forming the drill of the present embodiment is not particularly limited. Examples of the substrate include a cemented carbide, cermet, ceramic, a cubic boron nitride sintered body, a diamond sintered body and high-speed steel. From among the above examples, the substrate is further preferably comprised of at least one selected from the group consisting of a cemented carbide, cermet, ceramic and a cubic boron nitride sintered body because further excellent fracture resistance can be provided.

The drill of the present embodiment may have the same shape as conventional drills except that the honing width at the margin cutting edge portion satisfies the above-mentioned specific relationship.

In the present embodiment, honing is not particularly limited, and examples thereof include chamfer honing, R honing and combination honing.

Figure 1:
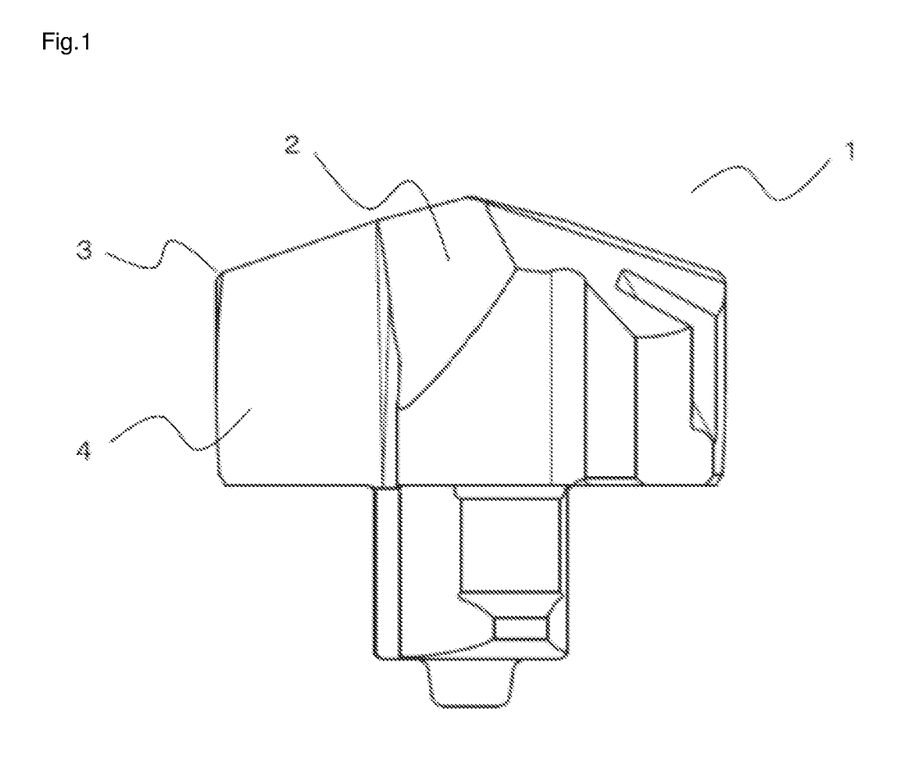
FIG. 1 shows an example of a side view of an insert body used in a drill according to the present invention.
Figure 2:
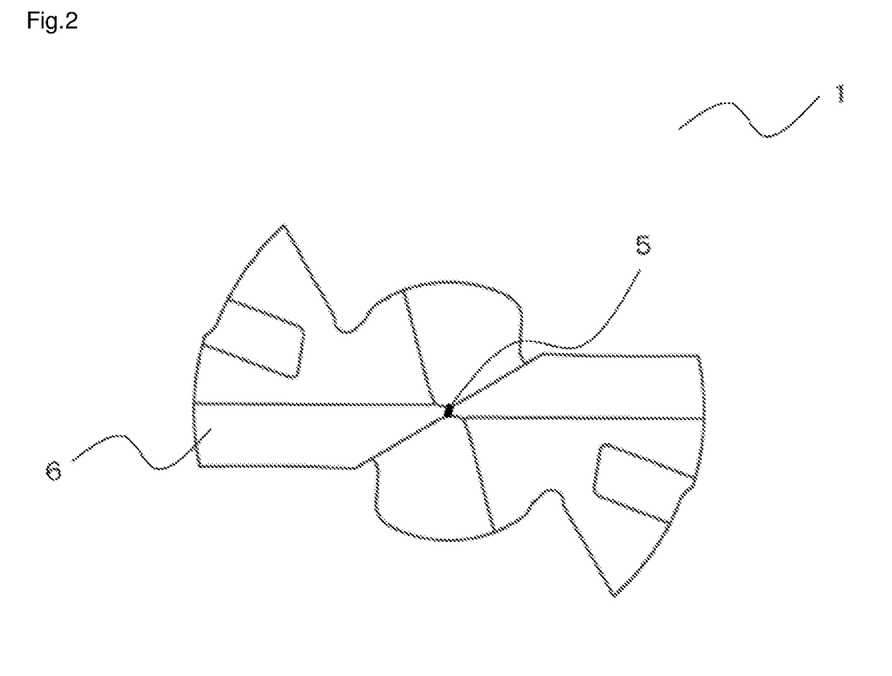
FIG. 2 shows an example of a front view of an insert body used in a drill according to the present invention.

FIGS. 1 to 3 each show an example of an insert body used for the drill of the present embodiment. This insert body 1 includes web thinning portions 2, shoulder portions 3, chip discharge grooves 4, a chisel 5, flanks 6, margin portions 7 and entire cutting edges 8. Such insert body is incorporated into a drill body 13, as shown in, for example, FIG. 5.

Figure 5:
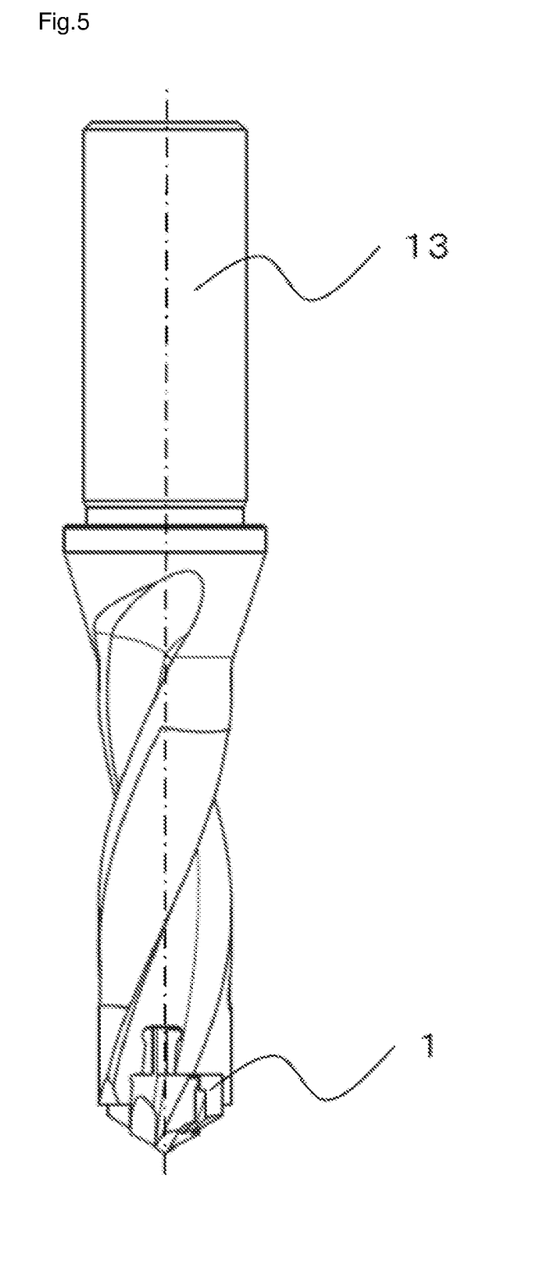
FIG. 5 shows an example of a schematic view of a drill according to the present invention.

As shown in FIG. 5, the drill body 13 is, for example, formed into a substantially cylindrical shape around an axis (the long-dashed short-dashed line in FIG. 5), and a base end side portion of the drill body 13 is regarded as a shank portion held by a rotational axis of a machine tool, whereas a leading end side portion thereof is regarded as the insert body (edge portion).

Further, as shown in FIGS. 1 to 3, in an outer periphery of the insert body 1 (edge portion), a pair of chip discharge grooves 4 are formed in a symmetrical manner with respect to an axis, and such chip discharge grooves 4 are twisted backward with respect to a drill rotating direction T at a constant helix angle, heading from the flank on the leading end side to the base end in an axial direction. The cutting edge 8 is formed in an intersecting edge between a rake surface of a leading end side region of an inner wall surface facing forward with respect to the drill rotating direction T in each of the chip discharge grooves 4 and the leading end flank of the edge portion.

As shown in FIG. 1, the web thinning portion 2 is formed so as to extend toward a leading end of the inner wall surface of the chip discharge groove 4.

The drill of the present embodiment is honed such that, in the margin cutting edge portion 12 shown in FIG. 4, the honing width gradually decreases from P1 to P2, and the honing width satisfies the relationship between the expressions (1) and (2). Since honing is performed on the drill of the present embodiment in this way, such drill has an excellent balance between wear resistance and fracture resistance, as a result of which the tool life can be extended.

As to the drill of the present embodiment having the above-described configuration, for instance, the drill body 13 is fed toward the leading end in the axial direction while being rotated around the axis, so that the drill body 13 gradually bites a workpiece, starting from an inner peripheral end of a web thinning cutting edge portion 9, whereby drilling is performed on such workpiece, and such drilling continues by discharging chips, such chips being generated by the cutting edge 8, toward the base end in the chip discharge groove 4.

Coated Drill

A coated drill of the present embodiment has the same shape as the above-mentioned drill except that a coating layer is formed on a surface thereof, and when the honing width at the boundary P1 between the margin cutting edge portion and the shoulder cutting edge portion is defined as R1 and the honing width at the position P2 separated 3 mm from the boundary P1 in the direction opposite to the second cutting edge portion in the margin cutting edge portion is defined as R2, the honing width gradually decreases from the boundary P1 toward the position P2, and the conditions represented by the following expression (1) and the following expression (2) are satisfied.

$$\text{honing width of second cutting edge portion} \leq R1 \quad (1)$$

$$2.0 < R1/R2 < 5.0 \quad (2).$$

The coated drill of the present embodiment can improve the wear resistance and the fracture resistance by setting the honing width at the margin cutting edge portion to satisfy the above-mentioned specific relationship, and as a result, the tool life can be extended.

In the coated drill of the present embodiment, the coating layer preferably comprises a compound layer containing a compound of: an element of at least one kind selected from the group consisting of Ti, Zr, Hf, V, Nb, Ta, Cr, Mo, W, Al and Si; and an element of at least one kind selected from the group consisting of C, N, O and B. Further, the compound layer may be comprised of a single layer or multiple layers of two or more layers. The coated drill of the present embodiment indicates the tendency of the wear resistance to be further improved if the coating layer comprises the above-described compound layer.

In addition, in the coated drill of the present embodiment, it is more preferable that the coating layer include a compound layer containing a compound having a composition represented by the following expression (4).

$$(Ti_{1-x}Si_x)N \quad (4)$$

(In the expression, x indicates an atomic ratio of the element Si to the total of the element Ti and the element Si and satisfies $0.05 \leq x \leq 0.40$.)

When the coating layer includes such a compound layer, the hardness of the coating layer increases, and the wear resistance of the coated drill of the present embodiment tends to be improved. Further, in the coated drill of the present embodiment, x in the expression (4) is 0.05 or more and 0.40 or less, and preferably 0.05 or more and 0.35 or less. In the coated drill of the present embodiment, when x in the expression (4) is equal to or more than the lower limit value, the hardness of the coating layer increases, and thus the wear resistance tends to be improved, and when x in the expression (4) is equal to or less than the upper limit value, the high temperature hardness increases, and thus the wear resistance tends to be improved. In particular, when the honing width satisfies 2.0<R1/R2, a region in which the workpiece and the drill come into contact with each other relatively increases, and thus a cutting temperature tends to be a higher temperature. For this reason, when the compound layer containing the compound having the composition represented by the expression (4): $(Ti_{1-x}Si_x)N$ is formed in the drill as the coating layer, the hardness of the coating layer increases and the wear resistance tends to be further improved. In addition, in the coated drill of the present embodiment, by setting the honing width at the margin cutting edge portion to satisfy the above-mentioned specific relationship and by causing the compound layer to be included in the coating layer, the progress of wear can be further inhibited, and thus it tends to be less likely to be chipped by maintaining the strength of the margin portion, and as a result, the tool life can be extended.

In the coated drill of the present embodiment, a thickness of the compound layer containing the compound having the composition represented by the expression (4) is preferably 0.5 μm or more and 5.0 μm or less, more preferably 1.0 μm or more and 4.5 μm or less, and further preferably 2.0 μm or more and 4.0 μm or less. In the coated drill of the present embodiment, when the thickness of the compound layer is equal to or more than the above lower limit value, the wear resistance tends to be further improved. On the other hand, when the thickness of the compound layer is equal to or less than the upper limit value, the fracture resistance tends to be further improved.

Also, in the coated drill of the present embodiment, it is more preferable that the coating layer include a compound layer containing a compound having a composition represented by the following expression (5).

$$(Ti_{1-y}Al_y)N \quad (5)$$

(In the expression, y indicates an atomic ratio of the Al element to the total of the element Ti and the Al element and satisfies $0.3 \leq y \leq 0.7$.)

In the coated drill of the present embodiment, when the coating layer includes such a compound layer, the wear resistance and the fracture resistance tend to be improved. Further, in the coated drill of the present embodiment, y in the expression (5) is 0.3 or more and 0.7 or less, and preferably 0.4 or more and 0.6 or less. In the coated drill of the present embodiment, when y in the expression (5) is equal to or more than the lower limit value, the wear resistance is improved since the hardness is improved due to solid solution strengthening, and the oxidation resistance tends to be improved due to the increased Al content, and when y in the expression (5) is equal to or less than the upper limit value, the toughness is improved by containing Ti, and thus the fracture resistance tends to be improved.

In the coated drill of the present embodiment, a thickness of the compound layer containing the compound having the composition represented by the expression (5) is preferably 0.5 μm or more and 8.0 μm or less, more preferably 1.0 μm or more and 7.5 μm or less, and further preferably 1.5 μm or more and 7.0 μm or less. In the coated drill of the present embodiment, when the thickness of the compound layer is equal to or more than the lower limit value, the wear resistance tends to be further improved. On the other hand, when the thickness of the compound layer is equal to or less than the upper limit value, the fracture resistance tends to be further improved.

Also, in the coated drill of the present embodiment, it is preferable that an average thickness of the entire coating layer be 0.5 μm or more and 8.0 μm or less.

In the coated drill of the present embodiment, when the average thickness of the entire coating layer is 0.5 μm or more, the wear resistance tends to be further improved. On the other hand, when the average thickness of the entire coating layer is 8.0 μm or less, the fracture resistance tends to be further improved. For that reason, the average thickness of the entire coating layer is preferably 0.5 μm or more and 8.0 μm or less. From the same viewpoint, the average thickness of the entire coating layer is more preferably 1.0 μm or more and 7.5 μm or less, and further preferably 1.5 μm or more and 7.5 μm or less.

Figure 7:
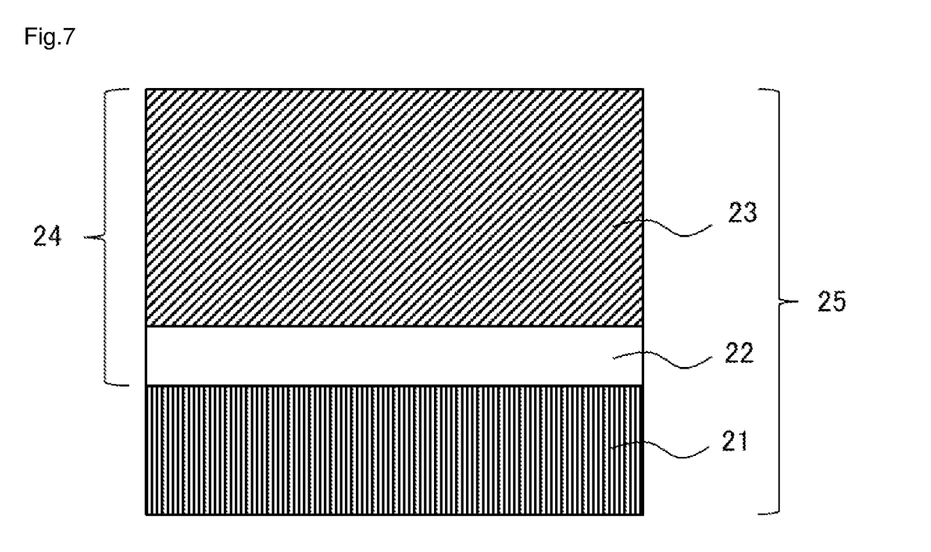
FIG. 7 shows an example of a schematic view of a cross-sectional structure of a coated drill according to the present invention.

FIG. 7 is a schematic view showing an example of a cross-sectional structure of the coated drill of the present embodiment. The coated drill 25 includes a substrate 21 and a coating layer 24 formed on a surface of the substrate 21. The coating layer 24 is formed by laminating a first layer 22 and a second layer 23 in order from the substrate 21 side.

In the present embodiment, the case in which the composition of each compound layer is expressed as, for example, $(Ti_{0.8}Si_{0.2})N$ means that the atomic ratio of the element Ti to the total of the element Ti and the element Si is 0.8 and the atomic ratio of the element Si to the total of the element Ti and the element Si is 0.2. That is, it means that an amount of the element Ti is 80 atomic % with respect to the total of the element Ti and the element Si, and an amount of the element Si is 20 atomic % with respect to the total of the element Ti and the element Si.

The coating layer used in the present embodiment preferably has an alternately laminated structure in which two or three or more layers having different compositions are alternately laminated. At least one layer in the alternately laminated structure preferably includes the compound layer containing the compound having the composition represented by the above-mentioned expression (4). Further, at least one layer in the alternately laminated structure of the coating layer used in the present embodiment preferably includes the compound layer containing the compound having the composition represented by the above-mentioned expression (5).

In the coated drill of the present embodiment, in a case in which the coating layer has the alternately laminated structure as described above, when the average thickness of each compound layer per layer is 70 nm or more, it is possible to inhibit an increase in an internal stress of the coating layer, and thus the fracture resistance tends to be improved. On the other hand, when the average thickness of each compound layer per layer is 300 nm or less, the effect of inhibiting the growth of cracks toward the substrate can be obtained, and thus the fracture resistance tends to be improved. From the same viewpoint, the average thickness of each compound layer per layer is preferably 100 nm or more and 300 nm or less, and more preferably 120 nm or more and 250 nm or less.

In the present embodiment, in a case in which two types of layers having different compositions are formed one by one, the "repetition number" is one, and the alternately laminated structure used in the present embodiment also includes a form in which the repetition number is one.

In the coated drill of the present embodiment, when the average thickness of the alternately laminated structure is 0.5 μm or more, the wear resistance tends to be further improved, and when it is 8.0 μm or less, the fracture resistance tends to be further improved.

The coating layer used in the present embodiment may be comprised of the above-described compound layer or the alternately laminated structure of each compound layer. However, it is preferable for a lower layer to be provided between the substrate and the alternating laminate structure (i.e., located as a layer below the alternating laminate structure) because the adhesion between the substrate and the alternating laminate structure is further improved. In particular, the lower layer, from the same perspective as that set forth above, preferably contains a compound of: an element of at least one kind selected from the group consisting of Ti, Zr, Hf, V, Nb, Ta, Cr, Mo, W, Al, Si and Y; and an element of at least one kind selected from the group consisting of C, N, O and B, more preferably contains a compound of: an element of at least one kind selected from the group consisting of Ti, V, Nb, Ta, Cr, Mo, W, Al, Si and Y; and an element of at least one kind selected from the group consisting of C, N, O and B, and further preferably contains a compound of: an element of at least one kind selected from the group consisting of Ti, Cr, Mo, Al, Si and Y; and N. Further, the lower layer may be comprised of a single layer or multiple layers of two or more layers.

In the present embodiment, when the average thickness of the lower layer is 0.1 μm or more and 3.5 μm or less, the adhesion between the substrate and the coating layer tends to be further improved, and thus this is preferable. From the same viewpoint, the average thickness of the lower layer is more preferably 0.2 μm or more and 3.0 μm or less, and further preferably 0.3 μm or more and 2.5 μm or less.

The coating layer used in the present embodiment may be configured of only the compound layer as described above or the alternately laminated structure of each compound layer, but an upper layer may be provided on a side of the alternating laminate structure which is opposite to the substrate (i.e., an upper layer on the alternating laminate structure), preferably on a surface of the alternating laminate structure. The upper layer further preferably contains a compound of: an element of at least one kind selected from the group consisting of Ti, Zr, Hf, V, Nb, Ta, Cr, Mo, W, Al, Si and Y; and an element of at least one kind selected from the group consisting of C, N, O and B because this provides further excellent wear resistance. Further, from the same perspective as that set forth above, the upper layer preferably contains a compound of: an element of at least one kind selected from the group consisting of Ti, Zr, Hf, V, Nb, Ta, Cr, Mo, W, Al, Si and Y; and an element of at least one kind selected from the group consisting of C, N, O and B, more preferably contains a compound of: an element of at least one kind selected from the group consisting of Ti, V, Nb, Ta, Cr, Mo, W, Al, Si and Y; and an element of at least one kind selected from the group consisting of C, N, O and B, and further preferably contains a compound of: an element of at least one kind selected from the group consisting of Ti, Nb, Ta, Cr, W, Al, Si and Y; and N. Further, the upper layer may be comprised of a single layer or multiple layers of two or more layers.

In the present embodiment, when the average thickness of the upper layer is 0.1 μm or more and 3.5 μm or less, it tends to be more excellent in wear resistance, and thus this is preferable. From the same viewpoint, the average thickness of the upper layer is more preferably 0.2 μm or more and 3.0 μm or less, and further preferably 0.3 μm or more and 2.5 μm or less.

A method of manufacturing a coating layer used in a coated drill according to the present embodiment is not particularly limited. However, examples of such method include physical vapor deposition methods, such as an ion plating method, an arc ion plating method, a sputtering method and an ion mixing method. In particular, the arc ion plating method is more preferable because further excellent adhesion is achieved between the coating layer and the substrate.

A method of manufacturing a coated drill according to the present embodiment will be described below, using specific examples. It should be noted that the method of manufacturing a coated drill according to the present embodiment is not particularly limited, as long as the configurations of the coated drill may be achieved.

Firstly, a substrate processed in the above-described drill shape is received in a reactor of a physical vapor deposition apparatus, and metal evaporation sources are placed in the reactor. Thereafter, the reactor is evacuated until the pressure therein indicates a vacuum of $1.0 \times 10^{-2}$ Pa or lower, and the substrate is heated, by a heater in the reactor, until the temperature is from 200° C. or higher to 700° C. or lower. After the heating, an Ar gas is introduced into the reactor so that the pressure therein is from 0.5 Pa or higher to 5.0 Pa or lower. In the Ar gas atmosphere with a pressure of from 0.5 Pa or higher to 5.0 Pa or lower, a bias voltage of from −500 V or higher to −350 V or lower is applied to the substrate, and a current of from 40 A or higher to 50 A or lower is caused to flow through a tungsten filament in the reactor, whereby an ion bombardment process is carried out, with the Ar gas, on a surface of the substrate. After the ion bombardment process is carried out on the substrate surface, the reactor is evacuated until the pressure therein indicates a vacuum of $1.0 \times 10^{-2}$ Pa or lower.

When forming the compound layer used in the present embodiment, the substrate is heated until the temperature is from 400° C. or higher to 600° C. or lower. After the heating, a gas is introduced into the reactor such that the pressure therein is from 0.5 Pa or higher to 5.0 Pa or lower. Examples of such gas include an $N_2$ gas when the compound layer comprises a compound of: an element of at least one kind selected from the group consisting of Ti, Zr, Hf, V, Nb, Ta, Cr, Mo, W, Al and Si; and N, and further examples of such gas also include a gas mixture of an $N_2$ gas and a $C_2H_2$ gas when the compound layer comprises a compound of: an element of at least one kind selected from the group consisting of Ti, Zr, Hf, V, Nb, Ta, Cr, Mo, W, Al and Si; and N and C. The volume ratio of the gas mixture is not particularly limited; however, such volume ratio may be $N_2$ gas:$C_2H_2$ gas=95:5 to 85:15, by way of example. Then, a bias voltage of from −80 V or higher to −40 V or lower is applied to the substrate, and a metal evaporation source according to the metal components of each layer is evaporated via an arc discharge with an arc current of from 100 A or higher to 200 A or lower, whereby the compound layer may be formed.

In the case of forming the compound layer containing the compound having the composition represented by the above expression (4): $(Ti_{1-x}Si_x)N$, the temperature of the substrate is controlled to be 200° C. to 500° C., nitrogen gas ($N_2$) is introduced into the reaction vessel, and the pressure in the reaction vessel is adjusted to 2.0 Pa to 5.0 Pa. After that, a bias voltage of 20 V to 150 V may be applied to the substrate, and the metal evaporation source corresponding to the metal component of the compound layer may be evaporated by an arc discharge of 100 A to 200 A to form the compound layer.

In the case of forming the compound layer containing the compound having the composition represented by the above expression (5): $(Ti_{1-y}Al_y)N$, the temperature of the substrate is controlled to be 200° C. to 500° C., nitrogen gas ($N_2$) is introduced into the reaction vessel, and the pressure in the reaction vessel is adjusted to 2.0 Pa to 5.0 Pa. After that, a bias voltage of 20 V to 150 V may be applied to the substrate, and the metal evaporation source corresponding to the metal component of the compound layer may be evaporated by an arc discharge of 100 A to 200 A to form the compound layer.

In order to form the alternately laminated structure in which two or three or more layers having different compositions are alternately laminated, two or more types of metal evaporation sources may be alternately evaporated by an arc discharge under the above-mentioned conditions, thereby forming the compound layers alternately. By adjusting an arc discharge time of the metal evaporation source, the thickness of each compound layer constituting the alternately laminated structure can be controlled.

When forming the lower layer and/or the upper layer used in the present embodiment, such lower layer and/or upper layer may be formed under the same manufacturing conditions as those described above for the compound layer. That is, firstly, the substrate is heated until the temperature is from 400° C. or higher to 600° C. or lower. After the heating, a gas is introduced into the reactor such that the pressure therein is from 0.5 Pa or higher to 5.0 Pa or lower. Examples of such gas include an $N_2$ gas when the lower layer and/or the upper layer comprise(s) a compound of: an element of at least one kind selected from the group consisting of Ti, Zr, Hf, V, Nb, Ta, Cr, Mo, W, Al, Si and Y; and N, and further examples of such gas also include a gas mixture of an $N_2$ gas and a $C_2H_2$ gas when the lower layer and/or the upper layer comprise(s) a compound of: an element of at least one kind selected from the group consisting of Ti, Zr, Hf, V, Nb, Ta, Cr, Mo, W, Al, Si and Y; and N and C. The volume ratio of the gas mixture is not particularly limited; however, such volume ratio may be $N_2$ gas:$C_2H_2$ gas=95:5 to 85:15, by way of example. Then, a bias voltage of from −80 V or higher to −40 V or lower is applied to the substrate, and a metal evaporation source according to the metal components of each layer is evaporated via an arc discharge with an arc current of from 100 A or higher to 200 A or lower, whereby the lower layer and/or the upper layer may be formed.

The thickness of each layer which constitutes the coating layer in the coated drill of the present embodiment can be measured from a cross-sectional structure of the coated drill, using an optical microscope, a scanning electron microscope (SEM), a transmission electron microscope (TEM), or the like. It should be noted that, as to the average thickness of each layer in the coated drill of the present embodiment, such average thickness can be obtained by: measuring the thickness of each layer, from each of the cross-sectional surfaces at three or more locations within 1 mm, along the cutting edge, from the shoulder portion toward the chisel thereof, and within 50 μm from the cutting edge toward the flank; and calculating the average value (arithmetic mean) of the resulting measurements.

The composition of each layer which constitutes the coating layer in the coated drill of the present embodiment can be measured from a cross-sectional structure of such coated drill, using an energy-dispersive X-ray spectroscope (EDS), a wavelength-dispersive X-ray spectroscope (WDS), or the like.

The coated drill of the present embodiment can be considered to provide the effect of being capable of extending the tool life compared with the prior art due to the major point of having excellent wear resistance and fracture resistance (it should be noted, however, that the factor for such extension of tool life is not limited thereto).

EXAMPLES

Although the present invention will be described in further detail below, with examples, the present invention is not limited to such examples.

Example 1

A machined exchangeable head drill of cemented carbide with the shape of a DMP120 insert (manufactured by Tungaloy Corporation) and a composition of 89.5WC-10Co-0.5$Cr_3C_2$ (or more mass %) was prepared as a substrate. Further, honing was performed on each portion of the insert so that the relationship between the honing widths of each portion was set as shown in Table 1. In addition, in Table 1, the "second cutting edge portion" is simply referred to as a "cutting edge portion."

In a reactor of an arc ion plating apparatus, a metal evaporation source was arranged s so that a coating layer had the composition shown in Table 2. The prepared substrate was fixed to a fixation fitting of a rotating table in the reactor.

Thereafter, the reactor was evacuated until the pressure therein indicated a vacuum of $5.0 \times 10^{-3}$ Pa or lower. After the evacuation, the substrate was heated, by a heater in the reactor, until the temperature reached 450° C. After the heating, an Ar gas was introduced into the reactor such that the pressure therein was 2.7 Pa.

In the Ar gas atmosphere with a pressure of 2.7 Pa, a bias voltage of −400 V was applied to the substrate, and a current of 40 A was caused to flow through a tungsten filament in the reactor, whereby an ion bombardment process was carried out, with the Ar gas, on a surface of the substrate for 30 minutes. After the ion bombardment process, the reactor was evacuated until the pressure therein indicated a vacuum of $5.0 \times 10^{-3}$ Pa or lower.

After evacuation, the substrate was controlled such that its temperature is 450° C. (a temperature at the start of film formation), nitrogen gas ($N_2$) was introduced into the reaction vessel, and the gas condition was adjusted such that the pressure inside the reaction vessel was 3.0 Pa. After that, a bias voltage of −40 V was applied to the substrate, and for invention samples 1 to 15 and comparative samples 1 to 6, a metal evaporation source with a first layer having the composition shown in Table 2 was evaporated by an arc discharge of an arc current of 150 A to form the first layer on the surface of the substrate, and for invention samples 16 to 18, a metal evaporation source with a first layer and a second layer having the composition shown in Table 2 was evaporated by an arc discharge of an arc current of 150 A to form the first layer and the second layer on the surface of the substrate. In this case, the gas condition and the pressure in the reaction vessel were controlled to maintain the above-mentioned conditions. Further, the thickness of each layer was controlled by adjusting an arc discharge time to have the thickness shown in Table 2.

After the formation of each layer with the predetermined average thickness shown in Table 2 on the substrate surface, the heater was turned off, and the sample was taken out of the reactor after the temperature of the sample reached 100° C. or lower.

The average thickness of each layer of each of the obtained samples was obtained by: measuring the thickness of each layer via a TEM observation of each of the cross-sectional surfaces at three locations within 1 mm, along the cutting edge, from the shoulder portion of the coated drill toward the chisel thereof, and within 50 μm from the cutting edge toward the flank; and calculating the average value (arithmetic mean) of the resulting measurements. The results are shown in Table 2.

The composition of each layer of the obtained sample was measured within 1 mm, along the cutting edge, from the shoulder portion of the coated drill toward the chisel thereof, and within 50 μm from the cutting edge toward the flank, using an EDS attached to a TEM. The results are shown in Table 2. It should be noted that the composition ratio of the metal elements of each layer in Table 2 refers to an atomic ratio of each metal element relative to all the metal elements in the metal compound which constitutes each layer.

Further, in the obtained sample, the arithmetic mean roughness Ra1 of the honed portion in the range from P1 to P2 and the arithmetic mean roughness Ra2 of the honed portion in the range exceeding P2 were measured according to JIS B0601 2001. The results are shown in Table 3.

Using the obtained samples, the following cutting test was conducted to perform evaluations.

Cutting Test

Workpiece: S55C (200HB),

Workpiece shape: 150 mm×200 mm×10 mm rectangular parallelepiped block,

Machining form: Through hole,

Cutting speed: 110 m/min,

Feed per revolution: 0.30 mm/rev,

Coolant: water-soluble coolant (internal oil supply system),

Evaluation item: A time when a chisel edge was fractured (chipping occurred in a chisel edge), when a feed mark occurred in a margin portion or when a flank wear had a width of 0.3 mm was defined as the end of the tool life, and the machining length to reach the end of the tool life was measured. The obtained measurement results are shown in Table 3.

TABLE 1

Relationship between honing widths at each portion

| Sample No. | Honing width (μm) R1 | R2 | Second cutting edge portion | Gradually decreasing from P1 toward P2 | Relationship between second cutting edge portion and R1 | R1/R2 |
|---|---|---|---|---|---|---|
| Invention sample 1 | 120 | 40 | 60 | Satisfy | Second cutting edge portion < R1 | 3.0 |
| Invention sample 2 | 55 | 20 | 40 | Satisfy | Second cutting edge portion < R1 | 2.8 |

TABLE 1-continued

Relationship between honing widths at each portion

| Sample No. | Honing width (μm) R1 | R2 | Second cutting edge portion | Gradually decreasing from P1 toward P2 | Relationship between second cutting edge portion and R1 | R1/R2 |
|---|---|---|---|---|---|---|
| Invention sample 3 | 195 | 45 | 60 | Satisfy | Second cutting edge portion < R1 | 4.3 |
| Invention sample 4 | 60 | 15 | 60 | Satisfy | Second cutting edge portion = R1 | 4.0 |
| Invention sample 5 | 120 | 45 | 60 | Satisfy | Second cutting edge portion < R1 | 2.7 |
| Invention sample 6 | 120 | 40 | 35 | Satisfy | Second cutting edge portion < R1 | 3.0 |
| Invention sample 7 | 120 | 40 | 95 | Satisfy | Second cutting edge portion < R1 | 3.0 |
| Invention sample 8 | 85 | 40 | 60 | Satisfy | Second cutting edge portion < R1 | 2.1 |
| Invention sample 9 | 190 | 40 | 60 | Satisfy | Second cutting edge portion < R1 | 4.8 |
| Invention sample 10 | 75 | 35 | 60 | Satisfy | Second cutting edge portion < R1 | 2.1 |
| Invention sample 11 | 120 | 40 | 60 | Satisfy | Second cutting edge portion < R1 | 3.0 |
| Invention sample 12 | 120 | 40 | 60 | Satisfy | Second cutting edge portion < R1 | 3.0 |
| Invention sample 13 | 120 | 40 | 60 | Satisfy | Second cutting edge portion < R1 | 3.0 |
| Invention sample 14 | 120 | 40 | 60 | Satisfy | Second cutting edge portion < R1 | 3.0 |
| Invention sample 15 | 120 | 40 | 60 | Satisfy | Second cutting edge portion < R1 | 3.0 |
| Invention sample 16 | 120 | 40 | 60 | Satisfy | Second cutting edge portion < R1 | 3.0 |
| Invention sample 17 | 120 | 40 | 60 | Satisfy | Second cutting edge portion < R1 | 3.0 |
| Invention sample 18 | 120 | 40 | 60 | Satisfy | Second cutting edge portion < R1 | 3.0 |
| Comparative sample 1 | 60 | 60 | 60 | Not satisfy | Second cutting edge portion = R1 | 1.0 |
| Comparative sample 2 | 80 | 100 | 60 | Not satisfy | Second cutting edge portion < R1 | 0.8 |
| Comparative sample 3 | 55 | 20 | 95 | Satisfy | Second cutting edge portion > R1 | 2.8 |
| Comparative sample 4 | 40 | 25 | 60 | Satisfy | Second cutting edge portion > R1 | 1.6 |
| Comparative sample 5 | 190 | 25 | 60 | Satisfy | Second cutting edge portion < R1 | 7.6 |
| Comparative sample 6 | 140 | 25 | 120 | Satisfy | Second cutting edge portion < R1 | 5.6 |

TABLE 2

| | Coating layer | | | | |
|---|---|---|---|---|---|
| | First layer | | Second layer | | Total |
| Sample No. | Composition | Thickness (μm) | Composition | Thickness (μm) | average thickness (μm) |
| Invention sample 1 | $(Ti_{0.6}Al_{0.4})N$ | 3.0 | — | | 3.0 |
| Invention sample 2 | $(Ti_{0.6}Al_{0.4})N$ | 3.0 | — | | 3.0 |
| Invention sample 3 | $(Ti_{0.6}Al_{0.4})N$ | 3.0 | — | | 3.0 |
| Invention sample 4 | $(Ti_{0.6}Al_{0.4})N$ | 3.0 | — | | 3.0 |
| Invention sample 5 | $(Ti_{0.6}Al_{0.4})N$ | 3.0 | — | | 3.0 |
| Invention sample 6 | $(Ti_{0.6}Al_{0.4})N$ | 3.0 | — | | 3.0 |
| Invention sample 7 | $(Ti_{0.6}Al_{0.4})N$ | 3.0 | — | | 3.0 |
| Invention sample 8 | $(Ti_{0.6}Al_{0.4})N$ | 3.0 | — | | 3.0 |
| Invention sample 9 | $(Ti_{0.6}Al_{0.4})N$ | 3.0 | — | | 3.0 |
| Invention sample 10 | $(Ti_{0.6}Al_{0.4})N$ | 3.0 | — | | 3.0 |
| Invention sample 11 | $(Ti_{0.8}Si_{0.2})N$ | 3.0 | — | | 3.0 |
| Invention sample 12 | $(Ti_{0.95}Al_{0.05})N$ | 3.0 | — | | 3.0 |
| Invention sample 13 | $(Ti_{0.65}Al_{0.35})N$ | 3.0 | — | | 3.0 |
| Invention sample 14 | $(Ti_{0.4}Al_{0.6})N$ | 7.5 | — | | 7.5 |
| Invention sample 15 | $(Ti_{0.4}Al_{0.6})N$ | 1.5 | — | | 1.5 |
| Invention sample 16 | $(Al_{0.7}Cr_{0.3})N$ | 1.0 | $(Ti_{0.8}Si_{0.2})N$ | 3.0 | 4.0 |
| Invention sample 17 | $(Ti_{0.8}Si_{0.2})N$ | 1.0 | $(Ti_{0.8}Si_{0.2})N$ | 3.0 | 4.0 |
| Invention sample 18 | TiN | 0.5 | $(Ti_{0.8}Si_{0.2})N$ | 3.0 | 3.5 |
| Comparative sample 1 | $(Ti_{0.6}Al_{0.4})N$ | 3.0 | — | | 3.0 |
| Comparative sample 2 | $(Ti_{0.6}Al_{0.4})N$ | 3.0 | — | | 3.0 |
| Comparative sample 3 | $(Ti_{0.6}Al_{0.4})N$ | 3.0 | — | | 3.0 |
| Comparative sample 4 | $(Ti_{0.6}Al_{0.4})N$ | 3.0 | — | | 3.0 |

TABLE 2-continued

| | Coating layer | | | | |
|---|---|---|---|---|---|
| | First layer | | Second layer | | Total |
| Sample No. | Composition | Thickness (μm) | Composition | Thickness (μm) | average thickness (μm) |
| Comparative sample 5 | $(Ti_{0.6}Al_{0.4})N$ | 3.0 | — | | 3.0 |
| Comparative sample 6 | $(Ti_{0.8}Si_{0.2})N$ | 3.0 | — | | 3.0 |

*The "—" symbol indicates that a coating layer was not formed.

TABLE 3

| | Arithmetic mean roughness (μm) | | Relationship between | Cutting test Machining length |
|---|---|---|---|---|
| Sample No. | Ra1 | Ra2 | Ra1 and Ra2 | (m) |
| Invention sample 1 | 0.6 | 0.9 | Ra1 < Ra2 | 78 |
| Invention sample 2 | 0.9 | 1.4 | Ra1 < Ra2 | 52 |
| Invention sample 3 | 0.2 | 1.0 | Ra1 < Ra2 | 75 |
| Invention sample 4 | 0.9 | 1.5 | Ra1 < Ra2 | 56 |
| Invention sample 5 | 0.6 | 1.0 | Ra1 < Ra2 | 62 |
| Invention sample 6 | 0.6 | 0.9 | Ra1 < Ra2 | 51 |
| Invention sample 7 | 0.6 | 0.9 | Ra1 < Ra2 | 68 |
| Invention sample 8 | 0.8 | 0.9 | Ra1 < Ra2 | 58 |
| Invention sample 9 | 0.3 | 0.9 | Ra1 < Ra2 | 66 |
| Invention sample 10 | 0.8 | 0.8 | Ra1 = Ra2 | 74 |
| Invention sample 11 | 0.5 | 0.8 | Ra1 < Ra2 | 88 |
| Invention sample 12 | 0.5 | 0.8 | Ra1 < Ra2 | 84 |
| Invention sample 13 | 0.5 | 0.8 | Ra1 < Ra2 | 80 |
| Invention sample 14 | 0.8 | 1.1 | Ra1 < Ra2 | 77 |
| Invention sample 15 | 0.5 | 0.8 | Ra1 < Ra2 | 53 |
| Invention sample 16 | 0.6 | 0.9 | Ra1 < Ra2 | 93 |
| Invention sample 17 | 0.6 | 0.9 | Ra1 < Ra2 | 90 |
| Invention sample 18 | 0.5 | 0.8 | Ra1 < Ra2 | 91 |
| Comparative sample 1 | 0.9 | 0.7 | Ra1 > Ra2 | 25 |
| Comparative sample 2 | 0.8 | 0.5 | Ra1 > Ra2 | 18 |
| Comparative sample 3 | 0.9 | 1.3 | Ra1 < Ra2 | 42 |
| Comparative sample 4 | 1.1 | 1.3 | Ra1 < Ra2 | 37 |
| Comparative sample 5 | 0.2 | 1.3 | Ra1 < Ra2 | 22 |
| Comparative sample 6 | 0.4 | 1.3 | Ra1 < Ra2 | 45 |

It is apparent from the above results that each invention sample has improved wear resistance and fracture resistance and accordingly has a long tool life.

INDUSTRIAL APPLICABILITY

The drill according to the present invention has excellent wear resistance and fracture resistance, whereby the tool life can be extended more than that involved in the prior art, and the drill therefore has high industrial applicability.

REFERENCE SIGNS LIST

1: Insert body, 2: Web thinning portion, 3: Shoulder portion, 4: Chip discharge groove, 5: Chisel, 6: Flank, 7: Margin portion, 8: Entire cutting edge (portion indicated by a double-thick line), 9: First cutting edge portion, 10: Second cutting edge portion, 11: Shoulder cutting edge portion, 12: Margin cutting edge portion, 13: Drill body, H: Honing width, T: Drill rotating direction, P1: boundary between margin cutting edge portion and shoulder cutting edge portion, P2: position separated 3 mm from the boundary P1 in the direction opposite to the second cutting edge portion in the margin cutting edge portion, 21: Substrate, 22: First layer, 23: Second layer, 24: Coating layer, 25: Coated drill.

What is claimed is:

1. A drill in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the drill comprising:
 a margin portion intersecting with the rake surface and facing toward the outer periphery;
 a shoulder portion being an intersecting edge between the margin portion and the leading end flank of the edge portion and extending, from an outer peripheral end of the cutting edge, backward with respect to the drill rotating direction; and
 a web thinning portion extending toward a leading end of the inner wall surface of the chip discharge groove, wherein
 the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion,
 honing is performed on the second cutting edge portion, the margin cutting edge portion and the shoulder cutting edge portion, when a honing width at a boundary P1 between the margin cutting edge portion and the shoulder cutting edge portion is defined as R1, and a honing width at a position P2 separated 3 mm from the boundary P1 in a direction opposite to the second cutting edge portion is defined as R2 in the margin cutting edge portion, the honing width gradually decreases from the boundary P1 toward the position P2, and conditions represented by expression (1) and expression (2) below are satisfied:

$$\text{honing width of second cutting edge portion} \leq R1 \quad (1)$$

$$2.0 < R1/R2 < 5.0 \quad (2),$$

when an arithmetic mean roughness of a honed portion in a first range from the boundary P1 to the position P2 is defined as Ra1, and an arithmetic mean roughness of a honed portion in a second range other than the first range in the margin cutting edge portion is defined as Ra2, a condition represented by expression (3) below is satisfied:

$$Ra1 < Ra2 \quad (3), \text{ and}$$

Ra1 is 0.1 μm or more and 1.0 μm or less, and Ra2 is 0.2 μm or more and 2.0 μm or less.

2. The drill according to claim 1, wherein the R1 is 50 μm or more and 200 μm or less, and the R2 is 15 μm or more and less than 50 μm.

3. The drill according to claim 2, wherein the honing width of the second cutting edge portion is 30 μm or more and 100 μm or less.

4. The drill according to claim 1, wherein the honing width of the second cutting edge portion is 30 μm or more and 100 μm or less.

5. A coated drill having a coated layer formed on a surface thereof, in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the coated drill comprising:

a margin portion intersecting with the rake surface and facing toward the outer periphery;

a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion, honing is performed on the second cutting edge portion, the margin cutting edge portion and the shoulder cutting edge portion, when a honing width at a boundary P1 between the margin cutting edge portion and the shoulder cutting edge portion is defined as R1, and a honing width at a position P2 separated 3 mm from the boundary P1 in a direction opposite to the second cutting edge portion is defined as R2 in the margin cutting edge portion, the honing width gradually decreases from the boundary P1 toward the position P2, and conditions represented by expression (1) and expression (2) below are satisfied:

$$\text{honing width of second cutting edge portion} \leq R1 \quad (1)$$

$$2.0 < R1/R2 < 5.0 \quad (2),$$

when an arithmetic mean roughness of a honed portion in a first range from the boundary P1 to the position P2 is defined as Ra1, and an arithmetic mean roughness of a honed portion in a second range other than the first range in the margin cutting edge portion is defined as Ra2, a condition represented by expression (3) below is satisfied:

$$Ra1 < Ra2 \quad (3), \text{ and}$$

Ra1 is 0.1 μm or more and 1.0 μm or less, and Ra2 is 0.2 μm or more and 2.0 μm or less.

6. The coated drill according to claim 5, wherein the coating layer comprises a compound layer containing a compound composed of at least one element selected from the group consisting of Ti, Zr, Hf, V, Nb, Ta, Cr, Mo, W, Al and Si, and at least one element selected from the group consisting of C, N, O and B.

7. The coated drill according to claim 6, wherein the coating layer comprises a compound layer containing a compound having a composition represented by expression (4) below:

$$(Ti_{1-x}Si_x)N \quad (4)$$

(in the expression, x indicates an atomic ratio of the element Si to a total of the element Ti and the element Si and satisfies $0.05 \leq x \leq 0.40$).

8. The coated drill according to claim 6, wherein an average thickness of the entire coating layer is 0.5 μm or more and 8.0 μm or less.

9. The coated drill according to claim 5, wherein the coating layer comprises a compound layer containing a compound having a composition represented by expression (4) below:

$$(Ti_{1-x}Si_x)N \quad (4)$$

(in the expression, x indicates an atomic ratio of the element Si to a total of the element Ti and the element Si and satisfies $0.05 \leq x \leq 0.40$).

10. The coated drill according to claim 9, wherein an average thickness of the entire coating layer is 0.5 μm or more and 8.0 μm or less.

11. The coated drill according to claim 5, wherein an average thickness of the entire coating layer is 0.5 μm or more and 8.0 μm or less.

12. The coated drill according to claim 5, wherein the R1 is 50 μm or more and 200 μm or less, and the R2 is 15 μm or more and less than 50 μm.

13. The coated drill according to claim 5, wherein the honing width of the second cutting edge portion is 30 μm or more and 100 μm or less.

* * * * *